Feb. 3, 1948.  E. L. HOLMES  2,435,276
MAGNETIC FIELD INDICATING MEANS
Filed Aug. 14, 1943  2 Sheets—Sheet 1
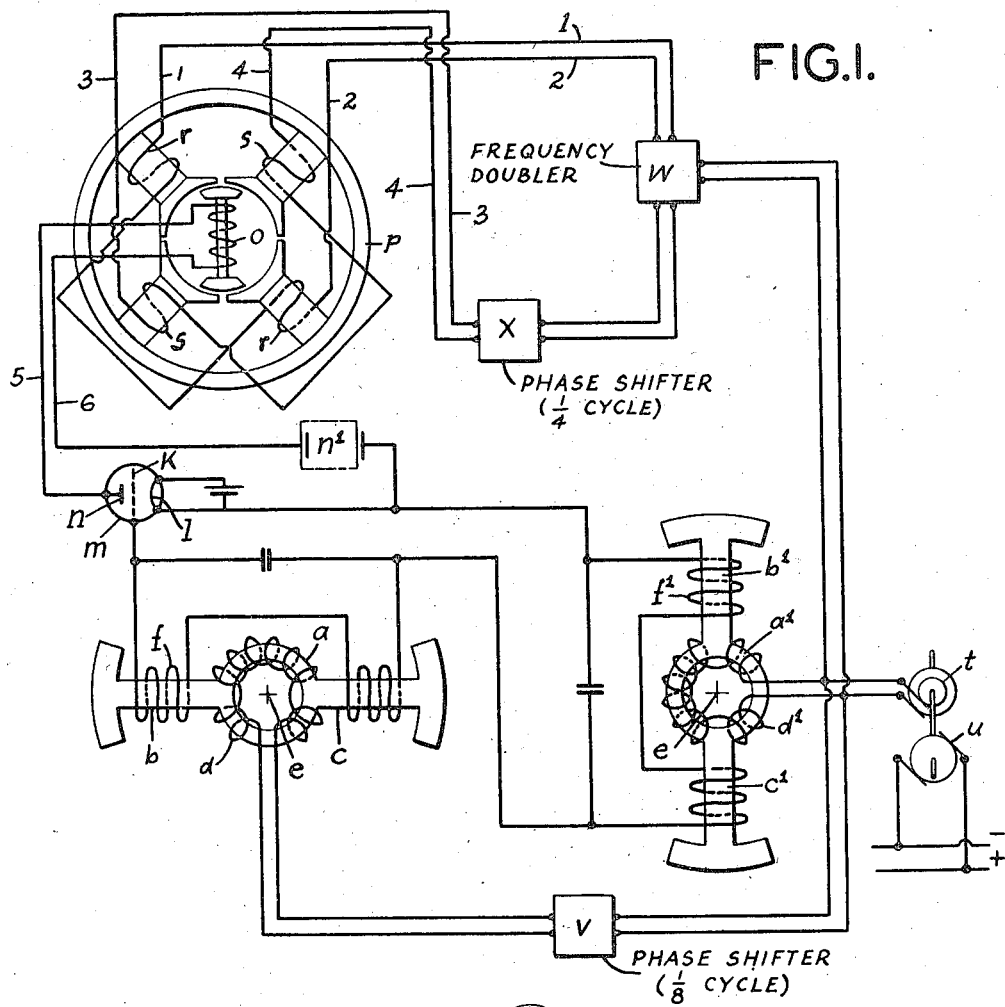
FIG.I.
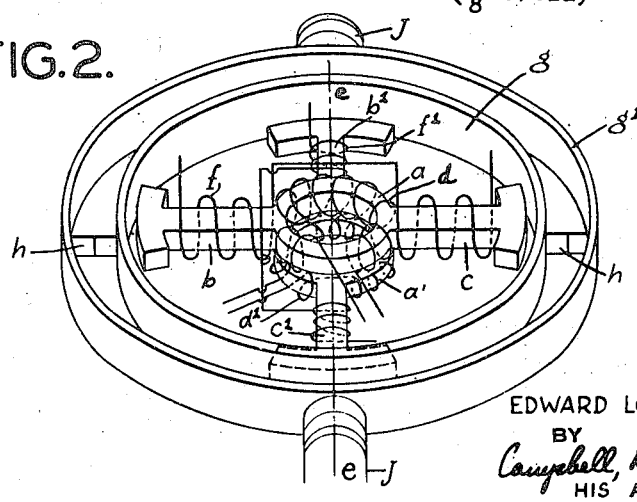
FIG.2.
INVENTOR.
EDWARD LOWTHER HOLMES
BY
Campbell, Brumbaugh & Free
HIS ATTORNEYS.

Patented Feb. 3, 1948

2,435,276

UNITED STATES PATENT OFFICE 2,435,276

MAGNETIC FIELD INDICATING MEANS

Edward Lowther Holmes, Barkingside, Ilford, England, assignor of one-half to Henry Hughes & Son Limited, London, England, a British limited liability company Application August 14, 1943, Serial No. 498,714
In Great Britain August 14, 1942

6 Claims. (Cl. 33—204)

This invention relates to improvements in magnetic field indicating means for apparatus of that kind in which the existence and direction of a magnetic field is ascertained by its inductive effect on coils wound on a magnetic core, the reluctance of which is varied periodically.

The object of the invention is to provide simpler and more effective means for applying the currents induced in the said coils to indicating means, repeaters and such like devices, whereby more accurate indications of the existence and direction of a magnetic field may be obtained.

The invention contemplates the employment of a single channel thermionic amplifier to enhance the value of all the currents induced in said coils, and the application of such amplified output to discriminating means, giving a visible reaction.

The invention also contemplates an improved machine of simple construction for generating the several alternating currents in correct phase relationship in an efficient and reliable manner.

The invention also contemplates a magnetically responsive instrumentality, which can be applied easily to a stabilised platform, thereby avoiding tilt errors.

The invention consists in improved magnetic field indicating means comprising an earth inductor system energised by two single phase alternating electrical currents differing in phase, a single channel thermionic amplifying circuit energised by the resultant alternating electrical potentials induced in said system by the magnetic field and a phasemeter instrumentality the moving element of which is energised by the amplified potential. A device of the type embodying the invention may be used as a compass, although it is not limited to such use.

In order that the invention may be the better understood examples thereof will now be described in relation to the accompanying drawing, the reference letters marked thereon denoting the same or equivalent parts in different figures in which:

Figure 1 shows diagrammatically one way of carrying the invention into effect.

Figure 2 is a perspective view showing diagrammatically one way of mounting the parts shown in Figure 1.

Figure 3:
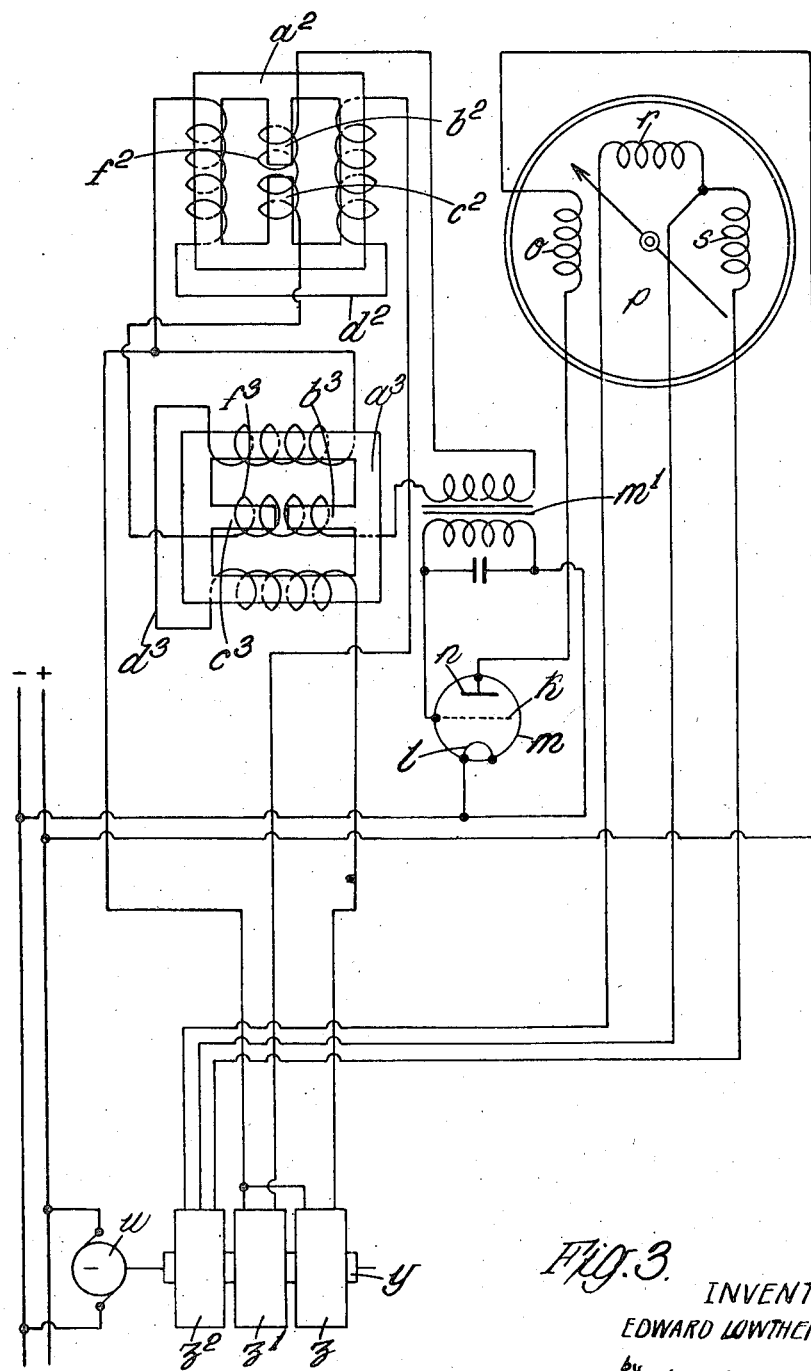
Figure 3 shows diagrammatically modifications in various parts.

The earth inductor system comprises two similar closed magnetic circuits which, as shown in Figures 1 and 2, are in the form of circular annular cores $a$ and $a^1$ of high permeability alloy.

Each of the cores $a$ and $a^1$ is provided with diametrically projecting poles, that is to say, the core $a$ has two poles $b$ and $c$ and the core $a^1$ has two poles $b^1$ and $c^1$.

The cores $a$ and $a^1$ have toroidal windings $d$ and $d^1$ respectively and are energised by alternating currents in differing phase relationship, the toroidal winding $d$ being energised by an alternating current the phase of which is displaced from the phase of the alternating current energising the toroidal winding $d^1$ by one-eighth cycle.

The two cores $a$ and $a^1$ with the respective energising windings $d$ and $d^1$ are arranged in adjacent parallel horizontal planes the one above the other on a common axis of rotation $c$—$c$ perpendicular to the cores $a$ and $a^1$ with the polar projections $b$ and $c$ at right angles to the polar projections $b^1$ and $c^1$.

The polar projections $b$ and $c$ are provided with an auxiliary winding $f$ (comprising two coils connected in electrical series) and the polar projections $b^1$ and $c^1$ with an auxiliary winding $f^1$ (comprising two coils connected in electrical series), so that each core has an auxiliary winding on the polar projections thereof.

When such a system of two superposed dipolar elements is placed in a magnetic field and periodically energised, two alternating potentials having a phase difference of one-quarter cycle will be induced in the auxiliary windings $f$ and $f^1$ of values depending on the relative direction of said magnetic field.

The system of two superposed dipolar elements described above will be subject to both dynamic and static tilt errors to avoid which the system as a whole may be mounted on a gyro stabilised platform accurately to maintain the level of said platform relatively to the horizon or when the dynamic tilt error can be ignored the system may be mounted pendulously in a gimbal suspension as shown diagrammatically in Figure 2, in which $g$ and $g^1$ are gimbal rings associated by the pivots $b$ and supported by bearings such as $j$.

The windings $f$ and $f^1$ are connected in electrical series and the resultant of the two alternating potentials induced therein is applied to the grid $k$ and cathode $l$ of the thermionic amplifying valve $m$, the plate $n$ and cathode $l$ of which are connected through the usual high tension battery $n^1$ to the winding $o$ on the pivoted permeable core constituting the armature of a phasemeter instrumentality $p$ having a stationary magnetic yoke with two pairs of poles at right angles to one another. The phasemeter $p$ is of a well known type and one example thereof is described in "Industrial Electrical Measuring Instruments," pages 294–305, by Edgcomb and Ockenden.

The requisite alternating currents of the correct frequencies and having the desired phase relationship to energise the arrangement can be obtained from any suitable sources, such for example as from the single phase alternating current generator $t$ driven by an electromotor $u$.

With such arrangement part of the output from the generator $t$ is supplied directly to the coil $d^1$, part of the said output is supplied indirectly to the coil $d$, through the circuit $v$ to shift the phase through one-eighth cycle and part of the said output is fed to a frequency doubler $w$ of well known type.

The output from the frequency doubler $w$ is fed to the polarising coils of the phasemeter instrumentality $p$ in part directly to the winding $r$ and in part indirectly to the winding $s$, through the circuit $x$ to shift the phase through one-quarter cycle so as to set up a rotating field in the polar area of the instrumentality $p$.

The currents from the coils $f$ and $f'$ are fed to the grid $k$ and the cathode $l$ respectively of the triode $m$, and give rise to a potential at the anode $n$, having a wave form similar in frequency to the frequency of the current from the coils $f$ or the coils $f'$, but varying in phase according to the heading.

If $\theta$ is the angle between the axis of symmetry of one of the flux valves and the direction of the magnetic field of an intensity H, and the properties of the two flux valves are identical and these valves are fed with energizing currents that are equal in amplitude and differ in phase by one-eighth cycle, then the voltage output produced by one flux valve is proportional to $H \cos \theta \sin 2\omega\tau$ and that produced by the other is proportional to $$H \sin \theta \sin 2\left(\omega\tau + \frac{\pi}{4}\right)$$

The sum of these terms is:

$$H\left(\cos \theta \sin 2\omega\tau + \sin \theta \sin \left(2\omega\tau + \frac{\pi}{2}\right)\right)$$

which can be simplified to:

$$H (\cos \theta \sin 2\omega\tau + \sin \theta \cos 2\omega\tau)$$

and written:

$$H \sin(2\omega\tau + \theta)$$

This represents a sinusoidal wave-form of double the energizing frequency, displaced in phase by the angle $\theta$ from the first energizing current and having an amplitude dependent on H but independent of the angle $\theta$. Thus by measuring the phase displacement of the resultant output by means of the phasemeter $p$, it is possible to obtain a measure of the displacement angle between the direction of the magnetic field and the axis of symmetry of the first flux valve.

Although the scalar value of the sum of the outputs may be the same for opposite directions of heading, there is no ambiguity at 180° because the vector quantities controlling the indication have opposite signs.

If desired, an alternating current generator having a single rotor $y$, driven by a direct current electromotor $u$ and three stators $z$, $z^1$ and $z^2$ as shown in Figure 3 may be used in which the output from the stator $z$ may be a single phase current at, say, four hundred cycles per second, the output from the stator $z^1$ may be a similar alternating current, the phase of which is displaced from the phase of the output from the stator $z$ by one-eighth cycle and the output from the stator $z^2$ may be a two phase alternating current at twice the frequency of the outputs from the stators $z$ and $z^1$, that is to say, eight hundred cycles per second.

It will be obvious that the closed ferromagnetic circuits need not be circular in shape as shown in Figures 1 and 2. As shown in Figure 3 the closed ferromagnetic circuits are in the form of hollow squares $a^2$ and $a^3$ having internally arranged polar projections $b^2c^2$ and $b^3c^3$, respectively, the two magnet structures formed being energized by alternating currents, differing in phase by one-eighth cycle, which are fed to the exciting windings $d^2$ and $d^3$.

Although in the arrangement shown in Figure 3, $b^2c^2$ and $b^3c^3$ have been shown as polar projections integral with the closed ferromagnetic circuits $a^2$ and $a^3$, respectively, clearly $b^2c^2$ and $b^3c^3$ may be made of a material having a lower value of permeability than that of the said circuits $a^2$ and $a^3$ provided that the reluctance of the subsidiary diametrically disposed magnetic paths including $b^2c^2$ or $b^3c^3$ is higher than that of the outer limbs, i. e., the hollow squares $a^2$ or $a^3$, when unsaturated, and lower than that of said limbs when saturated.

In this arrangement the resultant of the two alternating potentials induced in the auxiliary windings $f^2$ and $f^3$ is fed to the primary of an intervalve transformer $m^1$ the secondary of which is connected to the grid $k$ of the thermionic amplifying valve $m$ receiving high tension current from the mains supplying the electromotor $u$.

I claim:

1. A magnetic field indicating means comprising two annular elements of high permeability alloy disposed in adjacent horizontal planes and having a common vertical axis, a pair of oppositely projecting poles on each element with the poles on one element arranged at right angles to those on the other element, a thermionic amplifier having a grid, cathode and plate, a phasemeter of the type including a pivoted permeable core and a stationary magnetic yoke provided with two pairs of poles at right angles to each other, toroidal windings on said annular elements, windings on the poles of said annular elements connected in series with each other between said cathode and grid, a winding for said pivoted permeable core connected in a circuit between said plate and grid, windings for the poles of said magnetic yoke of said phasemeter, and means for energizing said toroidal windings by single phase alternating current displaced in phase by one-eighth of a cycle and said phasemeter polar windings respectively by single phase currents of double frequency displaced one-quarter cycle.

2. A magnetic field indicating means comprising two annular elements of highly permeable alloy disposed in adjacent horizontal planes and having a common vertical axis, a pair of oppositely projecting poles on each element with the poles on one element arranged at right angles to those on the other element, a thermionic amplifier having a grid, cathode and plate, a phasemeter of the type including a pivoted permeable core and a stationary magnetic yoke provided with two pairs of poles at right angles to each other, toroidal windings on said annular elements, windings on the poles of said annular elements connected in series with each other between said cathode and grid, a winding for said pivoted permeable core connected in a circuit between said plate and grid, windings for the poles of said magnetic yoke of said phasemeter, and means for energizing said toroidal windings by single phase alternating current displaced in phase by one-eighth of a cycle and said phasemeter polar windings respectively by single phase currents of double frequency displaced one-quarter cycle, said energizing means including a single phase alternating current generator, one-eighth single phase shifting means in the circuit of one of said toroidal windings, a frequency doubler in the circuits of the polar windings of said phasemeter and a one-quarter cycle phase shifting means in the circuit between said frequency doubler and one of said polar windings of said phasemeter.

3. A magnetic field indicating means comprising two annular elements of highly permeable alloys disposed in adjacent horizontal planes and having a common vertical axis, a pair of oppositely projecting poles on each element with the poles on one element arranged at right angles to those on the other element, a thermionic amplifier having a grid, cathode and plate, an indicating means including a controlling element, toroidal windings on said annular elements, windings on the poles of said annular elements connected in series between said cathode and grid, a winding for the controlling element in said indicating means connected in the circuit between said plate and grid, and means for energizing said toroidal windings by single phase alternating currents displaced in phase by one-eighth of a cycle.

4. A magnetic field indicating means comprising two rectangular members each provided with interior oppositely disposed poles and disposed in adjacent planes and at right angles to each other, windings on said poles connected in series, windings on the parallel side members of said rectangular members, and means for feeding single phase alternating currents displaced in phase of one-quarter of a cycle over said latter windings, and a transformer the primary of which is connected in the series circuit of said first-mentioned windings.

5. A magnetic field indicating means comprising two rectangular members each provided with interior oppositely disposed poles and disposed in adjacent planes and at right angles to each other, windings on said poles connected in series, windings on the parallel side members of said rectangular members, and means for feeding single phase alternating currents displaced in phase of one-quarter of a cycle over said latter windings, a transformer the primary of which is connected in the series circuit of said first-mentioned windings, indicating means including a controlling element and a thermionic amplifier including a grid and cathode connected in series with the secondary of the transformer and a plate connected in series with the controlling element of said indicating means.

6. A magnetic field indicating means comprising two symmetrical elements of magnetic material disposed in parallel planes and forming closed magnetic circuits therein, a pair of oppositely projecting poles on each element, the axes of each of said pairs of poles lying in the plane of symmetry of the corresponding element and being substantially perpendicular to one another, series connected windings disposed on each pole of said pairs of poles, windings disposed on said elements, means for energizing said element windings by alternating currents of given frequency that are displaced in phase by one-eighth of a cycle, respectively, thereby producing in said series connected pole windings a resultant voltage of double frequency whose magnitude is representative of the magnitude of an external field and whose phase is representative of the angle made by said field with one of said pole axes, means for amplifying said induced voltage, and means for determining the phase of the amplified voltage with respect to a voltage of said double frequency and of reference phase.

EDWARD LOWTHER HOLMES.

REFERENCES CITED

The following references are of record in the file of this patent:

UNITED STATES PATENTS

| Number | Name | Date |
| --- | --- | --- |
| 2,036,444 | Tolson | Apr. 7, 1936 |
| 2,361,433 | Stuart, Jr. | Oct. 31, 1944 |

FOREIGN PATENTS

| Number | Country | Date |
| --- | --- | --- |
| 451,850 | Great Britain | Aug. 10, 1936 |
| 98,414 | Sweden | Mar. 19, 1940 |